US006249775B1

(12) United States Patent
Freeman et al.

(10) Patent No.: US 6,249,775 B1
(45) Date of Patent: *Jun. 19, 2001

(54) METHOD FOR MORTGAGE AND CLOSED END LOAN PORTFOLIO MANAGEMENT

(75) Inventors: Charles J. Freeman; Xingxiong Xue, both of Tampa, FL (US)

(73) Assignee: The Chase Manhattan Bank, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,389

(22) Filed: Jul. 11, 1997

(51) Int. Cl.[7] ................................................. G06F 17/30
(52) U.S. Cl. .............................. 705/36; 705/35; 705/38; 705/40
(58) Field of Search ................................ 705/36, 40, 35, 705/38

(56) References Cited

U.S. PATENT DOCUMENTS

| 4,736,294 | * | 4/1988 | Gill et al. ................................ 705/38 |
| 4,953,085 | * | 8/1990 | Atkins .................................... 705/36 |
| 5,644,727 | * | 7/1997 | Atkins .................................... 705/40 |
| 5,966,700 | * | 10/1999 | Gould et al. ............................ 705/38 |

OTHER PUBLICATIONS

Rusnak, Raymond, "Subprime auto finance: What's the fuss?...", J of Lending and Credit Risk Management, v79 n9, p. 23(8) Apr. 1997.*
Ford, John K., "How to Benchmark Portfolio Risk", Portfolio Management, Winter 1997/1998; vol. 13, Iss. 1; p. 60, 3 pp).*
Aguais, Scott D., "Keeping Tabs on Credit Card Risk. (Financial Modeling)", American Banker, v157, n139, pp. 4–6, Jul. 1992.*
"Duff & Phelps Credit Rating Co. Assigns 'A+' Rating to Household Finance Corp.'s $ 200 Million Senior Debt Offering", PRNewswire, Chicago, Jun. 1995.*
Escarce, Jose J., "Admission Source to the Medical Intesive Care Unit Predicts Hospital Death Independent of APACHE II Score. (Acute Physiology And Chronic Health Evaluation)", JAMA, The Journal of the American Medical Association, v264, n18, pp. 2389–23, Nov. 1990.*
"Capital Auto Receivables Trust 1993–2 Notes 'AAA F–1+' By Fitch", Fitch Financial Wire, Jun. 1993.*

(List continued on next page.)

Primary Examiner—Vincent Millin
Assistant Examiner—Jagdish N Patel
(74) Attorney, Agent, or Firm—Ostrolenk, Faber, Gerb & Soffen, LLP

(57) ABSTRACT

A method for mortgage and closed end loan portfolio management in the form of an analytic tool designed to improve analysis of past and future performance of loan portfolios. In accordance with one aspect thereof, the invention aggregates loan units into loan vintages, wherein the loans in each vintage originate within a predetermined time interval of one another. The invention compares different vintages to one another in a manner such that the ages of the loans in the different vintages are comparable to one another. An early warning component of the system predicts delinquency rates expected for a portfolio of loans during a forward looking time window. A matrix link component of the invention combines the loan vintage analysis with the early warning component of the invention and predicts the default rate of the loan portfolios at a selected future point in time. The results of the analysis are graphically depicted and/or automatically fedback to provide "yes" or "no" decisions regarding investments in various loan portfolios.

32 Claims, 13 Drawing Sheets

OTHER PUBLICATIONS

Jonathan P. Pinder, Decision Analysis Using Multinomial Logit Models; Mortgage Portfolio Valuation, Journal of Economics and Business, 1996, pp. 67–77.

Mark Mathieson, Ordinal Models for Neural Networks, Department of Statistics, University of Oxford, 1996, pp. 523–536.

George H. John, Mortgage Data Mining, Global Business Intelligence Solutions, 1997, pp. 232–236.

Vijay S. Desai et al., A comparison of neural networks and linear scoring models in the credit union environment, European Journal of Operational Research, 1996, pp. 24–32.

L. Douglas Smith et al., A Comprehensive Model for Managing Credit Risk on Home Mortgage Portfolios, Decision Sciences, 1996, pp. 291–317.

* cited by examiner

FIG. 3

TIME ADJUSTED COMPARISON / DIAGONAL COMPARISON
AGE OF LOANS IN MONTHS

QUARTER OF ORIGINATION →

| QUARTER ENDING ↓ | MAR-93 | JUN-93 | SEP-93 | DEC-93 | MAR-94 | JUN-94 | SEP-94 | DEC-94 | MAR-95 | JUN-95 | SEP-95 | DEC-95 |
|---|---|---|---|---|---|---|---|---|---|---|---|---|
| JUNE-96 | 39 | 36 | 33 | 30 | 27 | 24 | 21 | 18 | 15 | 12 | 9 | 6 |
| MAR-96 | 36 | 33 | 30 | 27 | 24 | 21 | 18 | 15 | 12 | 9 | 6 | 3 |
| DEC-95 | 33 | 30 | 27 | 24 | 21 | 18 | 15 | 12 | 9 | 6 | 3 | N/A |
| SEP-95 | 30 | 27 | 24 | 21 | 18 | 15 | 12 | 9 | 6 | 3 | N/A | N/A |
| JUN-95 | 27 | 24 | 21 | 18 | 15 | 12 | 9 | 6 | 3 | N/A | N/A | N/A |
| MAR-95 | 24 | 21 | 18 | 15 | 12 | 9 | 6 | 3 | N/A | N/A | N/A | N/A |
| DEC-94 | 21 | 18 | 15 | 12 | 9 | 6 | 3 | N/A | N/A | N/A | N/A | N/A |
| SEP-94 | 18 | 15 | 12 | 9 | 6 | 3 | N/A | N/A | N/A | N/A | N/A | N/A |
| JUN-94 | 15 | 12 | 9 | 6 | 3 | N/A | N/A | N/A | N/A | N/A | N/A | N/A |
| MAR-94 | 12 | 9 | 6 | 3 | N/A | N/A | N/A | N/A | N/A | N/A | N/A | N/A |
| DEC-93 | 9 | 6 | 3 | N/A | N/A | N/A | N/A | N/A | N/A | N/A | N/A | N/A |
| SEP-93 | 6 | 3 | N/A | N/A | N/A | N/A | N/A | N/A | N/A | N/A | N/A | N/A |
| JUN-93 | 3 | N/A | N/A | N/A | N/A | N/A | N/A | N/A | N/A | N/A | N/A | N/A |
| MAR-93 | N/A | N/A | N/A | N/A | N/A | N/A | N/A | N/A | N/A | N/A | N/A | N/A |

DATA RESULTS EXTRACT OF CALCULATIONS

TOTAL NUMBER OF "BAD" LOANS

ORIGINATION AGE →

| MONTH/YR | 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| MAR-93 | 2 | 2 | 8 | 6 | 6 | 11 | 29 | 27 | 31 | 28 | 30 | 19 | 24 | 27 |
| JUN-93 | 8 | 5 | 9 | 14 | 7 | 19 | 28 | 41 | 42 | 34 | 20 | 32 | 36 | |
| SEP-93 | 9 | 16 | 14 | 17 | 31 | 37 | 53 | 36 | 38 | 22 | 27 | 59 | | |
| DEC-93 | 34 | 39 | 30 | 35 | 40 | 45 | 42 | 38 | 22 | 36 | 65 | | | |
| MAR-94 | 20 | 19 | 24 | 23 | 26 | 34 | 24 | 13 | 27 | 43 | | | | |
| JUN-94 | 9 | 7 | 19 | 26 | 48 | 45 | 24 | 34 | 65 | | | | | |
| SEP-94 | 6 | 7 | 13 | 22 | 26 | 17 | 24 | 45 | | | | | | |
| DEC-94 | 3 | 11 | 13 | 17 | 9 | 23 | 39 | | | | | | | |
| MAR-95 | 0 | 7 | 14 | 10 | 16 | 30 | | | | | | | | |
| JUN-95 | 2 | 9 | 11 | 10 | 30 | | | | | | | | | |
| SEP-95 | 1 | 2 | 7 | 22 | | | | | | | | | | |
| DEC-95 | 1 | 2 | 7 | | | | | | | | | | | |
| MAR-96 | 1 | 7 | | | | | | | | | | | | |
| JUN-96 | 3 | | | | | | | | | | | | | |

TOTAL NUMBER OF LOANS ("BAD" & "GOOD")

ORIGINATION AGE →

| MONTH/YR | 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| MAR-93 | 6,350 | 5,325 | 4,961 | 2,243 | 2,204 | 2,212 | 2,232 | 2,286 | 2,254 | 2,201 | 3,809 | 1,977 | 1,578 | 986 |
| JUN-93 | 7,305 | 5,972 | 3,105 | 3,060 | 2,998 | 3,003 | 3,109 | 3,088 | 3,055 | 2,712 | 2,538 | 2,344 | 1,325 | |
| SEP-93 | 7,191 | 4,022 | 3,890 | 3,808 | 3,786 | 3,785 | 3,743 | 3,743 | 3,204 | 3,009 | 2,898 | 1,918 | | |
| DEC-93 | 9,712 | 7,299 | 6,910 | 6,719 | 6,607 | 6,502 | 6,395 | 5,744 | 5,116 | 4,711 | 3,744 | | | |
| MAR-94 | 7,784 | 6,443 | 6,150 | 5,970 | 5,869 | 5,741 | 5,307 | 4,824 | 4,189 | 3,448 | | | | |
| JUN-94 | 5,985 | 5,634 | 5,529 | 5,391 | 5,098 | 4,633 | 4,284 | 3,951 | 3,339 | | | | | |
| SEP-94 | 6,540 | 6,345 | 6,227 | 5,271 | 4,681 | 4,290 | 3,994 | 3,443 | | | | | | |
| DEC-94 | 5,979 | 5,856 | 5,159 | 4,653 | 4,354 | 4,099 | 3,626 | | | | | | | |
| MAR-95 | 3,864 | 3,313 | 3,127 | 2,918 | 2,772 | 2,576 | | | | | | | | |
| JUN-95 | 6,322 | 6,204 | 5,991 | 5,791 | 5,425 | | | | | | | | | |
| SEP-95 | 3,546 | 3,482 | 3,446 | 3,091 | | | | | | | | | | |
| DEC-95 | 3,231 | 3,271 | 3,089 | | | | | | | | | | | |
| MAR-96 | 2,401 | 2,454 | | | | | | | | | | | | |
| JUN-96 | 4,173 | | | | | | | | | | | | | |

FIG. 4A-2

SUM OF 4 QUARTERS

| BAD LOANS ORIGINATION MONTH/YR | AGE → 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| 1993 | 53 | 62 | 61 | 72 | 84 | 112 | 152 | 142 | 133 | 120 | 142 | 110 | 60 | 27 |
| 1994 | 38 | 44 | 69 | 88 | 109 | 119 | 111 | 92 | 92 | 43 | 0 | 0 | 0 | 0 |

| ALL LOANS ORIGINATION MONTH/YR | AGE → 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| 1993 | 30,558 | 22,618 | 18,866 | 15,830 | 15,595 | 15,502 | 15,479 | 14,861 | 13,629 | 12,633 | 12,989 | 6,239 | 2,903 | 986 |
| 1994 | 26,288 | 24,278 | 23,065 | 21,285 | 20,002 | 18,763 | 17,211 | 12,218 | 7,528 | 3,448 | 0 | 0 | 0 | 0 |

| BAD RATE ORIGINATION MONTH/YR | AGE → 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| 1993 | 0.17% | 0.27% | 0.32% | 0.45% | 0.54% | 0.72% | 0.98% | 0.96% | 0.98% | 0.95% | 1.09% | 1.76% | 2.07% | 2.74% |
| 1994 | 0.14% | 0.18% | 0.30% | 0.41% | 0.54% | 0.63% | 0.64% | 0.75% | 1.22% | 1.25% | N/A | N/A | N/A | N/A |

| STD DEV ORIGINATION MONTH/YR | AGE → 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| 1993 | 0.02% | 0.03% | 0.04% | 0.05% | 0.06% | 0.07% | 0.08% | 0.08% | 0.08% | 0.09% | 0.09% | 0.17% | 0.26% | 0.52% |
| 1994 | 0.02% | 0.03% | 0.04% | 0.04% | 0.05% | 0.06% | 0.06% | 0.08% | 0.13% | 0.19% | | | | |

| RATE DIFFERENCE | AGE → 3 MTHS | 6 MTHS | 9 MTHS | 12 MTHS | 15 MTHS | 18 MTHS | 21 MTHS | 24 MTHS | 27 MTHS | 30 MTHS | 33 MTHS | 36 MTHS | 39 MTHS | 42 MTHS |
|---|---|---|---|---|---|---|---|---|---|---|---|---|---|---|
| 1993-1994 | 0.03% | 0.09% | 0.02% | 0.04% | -0.01% | 0.09% | 0.34% | 0.20% | -0.25% | -0.30% | 1.09% | 1.76% | 2.07% | 2.74% |
| STD DEV | 0.03% | 0.04% | 0.05% | 0.07% | 0.08% | 0.09% | 0.10% | 0.11% | 0.15% | 0.21% | | | | |
| STD DEV | -0.03% | -0.04% | -0.05% | -0.07% | -0.08% | -0.09% | -0.10% | -0.11% | -0.15% | -0.21% | | | | |

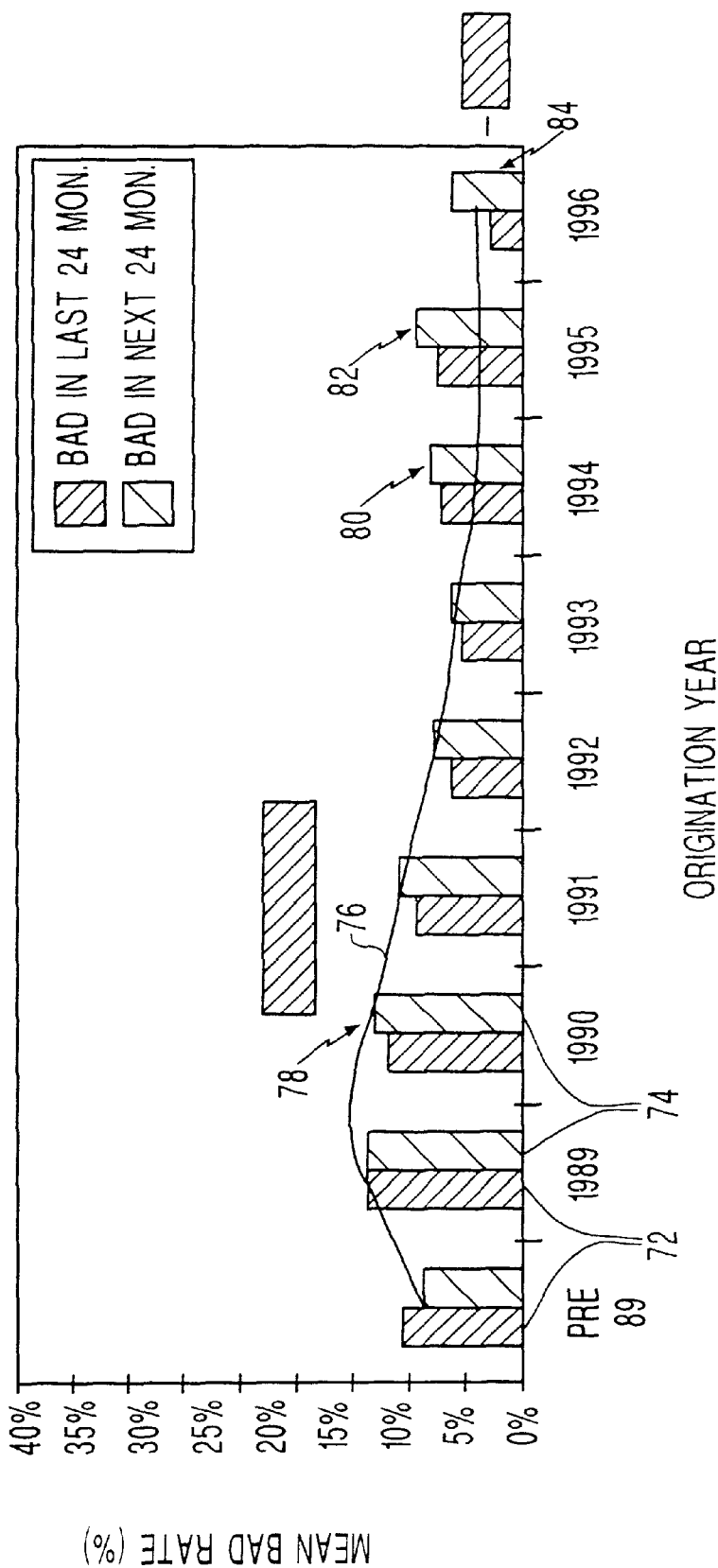

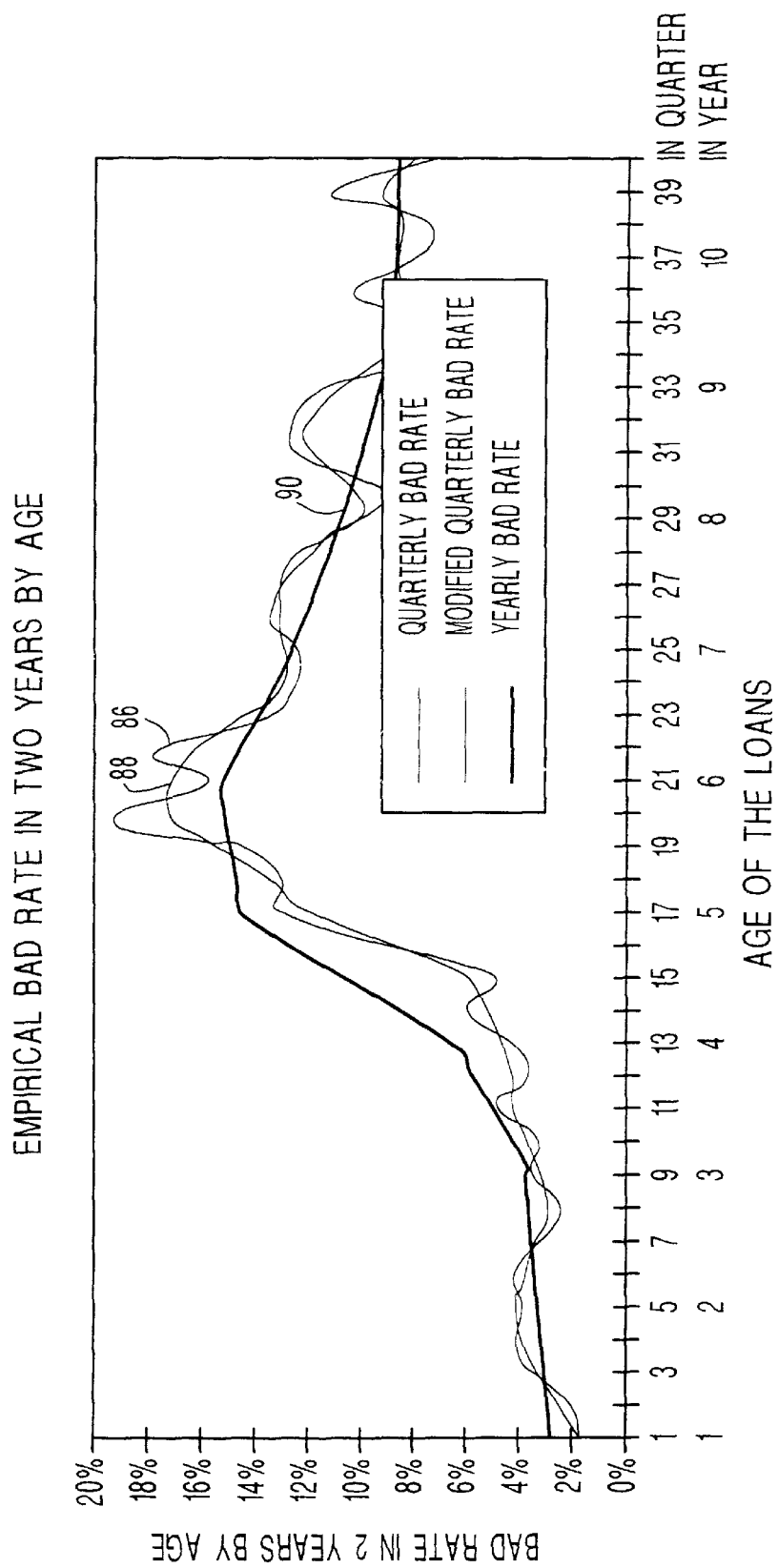

FIG. 7

ROLL RATE OF DELINQUENCY FOR ONE YEAR

| AGE OF LOANS | FROM / TO | CONFORMING LOANS | | | JUMBO LOANS | | | GOVERNMENT LOANS | | |
|---|---|---|---|---|---|---|---|---|---|---|
| | | BAD | GOOD | EXIT | BAD | GOOD | EXIT | BAD | GOOD | EXIT |
| 1 YEAR | BAD | 43.08% | 38.46% | 18.46% | 28.15% | 48.89% | 22.96% | 69.83% | 23.05% | 7.11% |
| | GOOD | 0.27% | 72.52% | 27.21% | 0.31% | 82.69% | 17.01% | 1.60% | 91.63% | 6.77% |
| 2 YEAR | BAD | 63.93% | 19.17% | 16.90% | 57.61% | 20.58% | 21.81% | 78.76% | 11.76% | 9.49% |
| | GOOD | 0.30% | 71.00% | 28.70% | 0.38% | 80.63% | 18.99% | 1.99% | 87.77% | 10.24% |
| 3 YEAR | BAD | 65.78% | 14.65% | 19.57% | 55.04% | 11.17% | 33.79% | 76.28% | 7.81% | 15.91% |
| | GOOD | 0.46% | 72.34% | 27.19% | 0.58% | 79.77% | 19.65% | 2.48% | 84.47% | 13.05% |
| 4 YEAR | BAD | 55.19% | 9.62% | 35.20% | 39.47% | 6.95% | 53.57% | 75.15% | 6.21% | 18.63% |
| | GOOD | 1.22% | 72.64% | 26.13% | 1.42% | 77.08% | 21.50% | 3.12% | 80.76% | 16.11% |
| 5 YEAR | BAD | 53.51% | 9.36% | 37.13% | 33.69% | 5.79% | 60.52% | 72.55% | 5.97% | 21.48% |
| | GOOD | 2.08% | 74.66% | 23.26% | 2.41% | 74.15% | 23.44% | 3.69% | 79.72% | 16.59% |
| 6 YEAR | BAD | 46.57% | 8.69% | 44.74% | 36.48% | 4.72% | 58.80% | 71.73% | 6.99% | 21.28% |
| | GOOD | 1.55% | 75.70% | 22.74% | 1.36% | 71.42% | 27.22% | 3.64% | 78.86% | 17.50% |
| 7 YEAR | BAD | 65.51% | 10.65% | 23.84% | 56.91% | 10.57% | 32.52% | 69.34% | 8.66% | 22.00% |
| | GOOD | 1.34% | 77.12% | 21.54% | 1.03% | 69.20% | 29.76% | 2.88% | 78.69% | 18.42% |
| 8 YEAR | BAD | 71.60% | 13.12% | 15.28% | 81.82% | 5.19% | 12.99% | 70.53% | 10.67% | 18.80% |
| | GOOD | 0.98% | 75.85% | 23.17% | 0.94% | 80.49% | 18.57% | 2.83% | 80.61% | 16.56% |
| 9 YEAR | BAD | 67.03% | 14.98% | 18.00% | 63.64% | 21.21% | 15.15% | 70.88% | 11.09% | 18.03% |
| | GOOD | 1.00% | 74.59% | 24.40% | 0.54% | 81.68% | 17.77% | 2.48% | 83.65% | 13.87% |
| 10 YEAR | BAD | 62.10% | 12.17% | 25.73% | 83.33% | 8.33% | 8.33% | 73.86% | 9.52% | 16.61% |
| | GOOD | 0.77% | 70.16% | 29.06% | 2.37% | 71.60% | 26.04% | 2.84% | 79.52% | 17.64% |

FIG. 8

THE CLASSIC ROLL-RATE FORECAST

| ORIG. QUARTER | CURRENT INFORMATION | | | ROLL RATE FROM BAD TO | | ROLL RATE FROM GOOD TO | | INFORMATION AT THE END OF THE NEXT QUARTER (FORECAST) | | | |
|---|---|---|---|---|---|---|---|---|---|---|---|
| | AGE | # OF LOANS | BAD RATE | BAD | EXIT | BAD | EXIT | AGE | NEW # OF LOANS | NEW # OF BAD LOANS | BAD RATE |
| 1Q, 1995 | 8 | $N_8$ | $R_8$ | $B(8,1)$ | $E(8,1)$ | $b(8,1)$ | $e(8,1)$ | 9 | $N_8*R_8*(1-E(8,1))+$ $N_8*(1-R_8)*(1-e(8,1))$ | $N_8*R_8*B(8,1)+$ $N_8*(1-R_8)*b(8,1)$ | NEW # OF BAD LOANS / NEW # OF LOANS |
| 2Q, 1995 | 7 | $N_7$ | $R_7$ | $B(7,1)$ | $E(7,1)$ | $b(7,1)$ | $e(7,1)$ | 8 | $N_7*R_7*(1-E(7,1))+$ $N_7*(1-R_7)*(1-e(7,1))$ | $N_7*R_7*B(7,1)+$ $N_7*(1-R_7)*b(7,1)$ | NEW # OF BAD LOANS / NEW # OF LOANS |
| 3Q, 1995 | 6 | $N_6$ | $R_6$ | $B(6,1)$ | $E(6,1)$ | $b(6,1)$ | $e(6,1)$ | 7 | $N_6*R_6*(1-E(6,1))+$ $N_6*(1-R_6)*(1-e(6,1))$ | $N_6*R_6*B(6,1)+$ $N_6*(1-R_6)*b(6,1)$ | NEW # OF BAD LOANS / NEW # OF LOANS |
| 4Q, 1995 | 5 | $N_5$ | $R_5$ | $B(5,1)$ | $E(5,1)$ | $b(5,1)$ | $e(5,1)$ | 6 | $N_5*R_5*(1-E(5,1))+$ $N_5*(1-R_5)*(1-e(5,1))$ | $N_5*R_5*B(5,1)+$ $N_5*(1-R_5)*b(5,1)$ | NEW # OF BAD LOANS / NEW # OF LOANS |

NOTE: THE AGE IS IN QUARTERS.
NOTE: THE PARAMETERS IN $B(8,1)$ HAVE THE FOLLOWING MEANING: 8 IS THE AGE (IN QUARTERS), 1 IS THE FORECAST TIME PERIOD (IN QUARTER).

METHOD FOR MORTGAGE AND CLOSED END LOAN PORTFOLIO MANAGEMENT

BACKGROUND OF THE INVENTION

The present invention relates to banking and, more particularly, to a loan performance analytic tool designed to improve analysis of past and future performance of loan portfolios.

Financial institutions such as banks own large portfolios of mortgage and other closed end loan instruments. Further, there is a constant influx of applications for new loans and mortgages and, moreover, existing loans are treated by banks as commodities or products which they trade among themselves. Banks underwrite loans and/or purchase loan portfolios of other banks or sell portions of their own loan portfolios. In doing so, banks customarily continually assess and reassess the quality of various loan portfolios, which quality depends on the interest rates earned on those loans, the customer payment history on the loans and other criteria.

As regards newly originated loans, the process begins with loan applicants submitting applications to financial institutions which then triggers an investigation by either the bank and/or related service organizations which check the credit history of the applicant before the loan is approved. Typically, the decision to grant or not grant a loan implicates various credit screens that examine such factors as the loan to value ratio (LTV) of the particular application or the debt to income ratio (D/I) of the applicant and other historical facts, which shed light on the commercial worthiness of the given loan transaction. Once a loan is granted, it becomes part of an aforementioned vast portfolio of loans which a given financial institution owns and/or services. The "quality" of the particular loan heavily depends on the interest fees earned by the financial institution on each loan and on the performance of the loan which is dependent on the timeliness of the payments by the loan applicant and/or on loan prepayment.

Loan portfolios represent to banks two separate and distinct lines of business or sources of income. One business line or source of income flows from the ownership of the loans and the earning of interest fees thereon. The second line of business involves the servicing of the loan, for example, the keeping of records, collection of periodic payments, enforcement in the form of loan foreclosures, etc. Banks can earn fees on servicing of loans which they either own outright or which they service on behalf of other financial institutions. This is because it is traditional in the banking industry to attribute to each loan a basic cost of servicing which is included in the interest fees charged to the customer. If a bank is able to carry out or perform these servicing tasks at a cost structure which is below the originally attributed servicing cost, the bank is able to realize a profit from its loan servicing business.

It is not uncommon for large financial institutions to immediately turn around and sell to other investors portions of the loans that they have booked, to spread the credit risks and in order to diversify the types of loan instruments that they are holding. The same is true of the services end of the business with respect to which decisions are constantly made as to whether retain or sell the servicing components of various groups of loans.

The loans that are retained for servicing are assigned to a subsidiary of the financial institution which is a purely service organization that has developed the methodology and procedures for servicing loans. A portion of the loan portfolio can be sold to third party loan servicing bureaus. It is common for banks which sell loans to retain ownership of the servicing rights to earn the fee income thereon. In addition, many financial institutions may decide to purchase servicing rights from other financial institutions.

In any case, bank managers are responsible for managing loans totalling billions of dollars both as pure loan instruments and as products that require servicing. The decisions whether to retain different groups of loans or whether to sell them off to other investors and, on the other hand, whether to purchase loan portfolios from other institution for ownership or servicing purposes are bottom line decisions that have the potential to affect the financial institution's profits and/or losses to the tune of tens or even hundreds of millions of dollars. Hence, loan portfolios are constantly examined by bank managers very carefully since different vintages of loans can perform quite differently from one another.

For example, a portfolio of loans representing mortgages granted in a particular locality during a particular time frame might be deemed to represent high quality loan instruments, as for example in the situation where the history of these groups of loans has shown that the rate of default for that group of loans has been extremely low and the interest rate on those loans is high compared to present interest rates. Conversely, another portfolio of loans granted in another region of the country which may have suffered economic decline may result at some future date in large rates of default. Assuming further that these loans were issued at a low interest rate, it is not difficult to understand that the particular "product"—the portfolio of loans—would be deemed to possess low value and be a good candidate for being sold. Alternatively, a shrewd bank manager might see future value in a presently poorly performing loan portfolio and seek to buy at its current low price structure for its potential improvement. In the same vein, the "servicing" of such loans may be more difficult and expensive due to higher default instances. A bank might wish to sell off the ownership component of such a loan portfolio, or the servicing rights thereof, or both. Sometimes, however, a financial institution which has a "servicing" subsidiary that is being underutilized may be willing to accept loan portfolios of servicing rights considered unattractive by other financial institutions.

In the prior art, bank managers entrusted with making the aforementioned decisions have often resorted to and relied on manual research and their intuition in their attempts to predict, manage and select loan portfolios for ownership and servicing purposes. The prior art approach has failed to provide a straightforward and easy to comprehend and administer system for assessing the past performance and future likely course of loan instruments.

SUMMARY OF THE INVENTION

Accordingly, it is an object of the present invention to provide a system and method which improves the understanding of the past performance of loan portfolios.

It is another object of the invention to provide a system which enhances the ability of financial institution managers to choose which mortgage and other debt instrument applications to underwrite.

Yet another object of the present invention is to provide a system and method which enhances the ability of financial institution personnel to make decisions whether to retain or dispose of different groups of loans.

It is also an object of the present invention to provide a system and a method which is able to dynamically and automatically evolve loan underwriting criteria.

It is yet another object of the present invention to provide a dynamic underwriting model which is capable of being implemented in a general purpose computer.

It is also a further object of the present invention to provide a system and methodology which enables automatic processing of loan applications through a system that feedbacks information from a dynamic processor and which allows loan acceptance decisions to be made automatically and rapidly.

The foregoing and other objects of the invention are realized by a system and process which is tailored to analyze and select loan portfolios for either continued or future investment by a financial institution. Each loan portfolio comprises a plurality of loan units and the system operates by separating the loan portfolios into a plurality of loan vintages, in a manner such that the loans included in each loan vintage have origination dates that are on average of the same age. The system of the invention produces an analysis of the past performance of loan portfolios, as well as an indication of the future performance thereof in two different formats.

As to past performance, the invention develops the loan vintages in a manner such that vintages of different years can be compared to one another meaningfully because the loan units in each of the different vintages are actually of the same comparative ages. For example, when 1993 and 1994 loan vintages are compared, the loans units that are being compared are of the same age to provide more meaningful comparisons. This is referred to in the ensuing description as the Crus Classes analysis system. In one embodiment of the Crus Classes system, output results are graphically depicted by means of a curve which represents the difference between the delinquency rates of loans in the two yearly vintages. To improve the reliability of the results, an area of uncertainty is superimposed over the difference to allow users to focus their analysis on those locations on the difference plot which lies outside the area of uncertainty. This increases the reliability of the analysis and the ability to trust its results. The area of uncertainty can be calculated as a +1 and −1 standard deviation, but the actual size thereof is a matter of personal choice.

The early warning system (EWS) constituent of the invention is one of the systems and processes which predicts the percentage of the loans in a given loan vintage which are likely to enter a "bad" state within a predefined forward looking time window, for example, the next two years. The prediction is calculated by using a logistic regression formula which has been developed in part on the basis of the analytic results obtained from the Crus Classes analysis component of the invention.

Finally, the so-called matrix link component of the present invention is generally similar to the aforementioned early warning system in that it is a prediction tool. It differs from the early warning system in the respect that it is capable of forecasting the percentage of loans that are likely to be bad at a date certain within the aforementioned forward looking time window. In all cases, the results of the analysis can be graphically depicted by comparing vintages to one another, using various curves, bar charts and the like in a manner described herein. For imposing the integrity of the results it is desirable that the number of loan units in the analysis be large, preferably in the hundreds of thousands of loan units and preferably at least 50,000 loan units.

As a general note and definition applicable to throughout the present specification and claims, the term "loan portfolios" means, includes and/or refers to booked loans, applications for loans for which underwriting decisions have to be made and the aforementioned loan servicing rights.

Other features and advantages of the present invention will become apparent from the following description of the invention which refers to the accompanying drawings.

BRIEF DESCRIPTION OF THE DRAWINGS

FIG. 3 illustrates a novel method of assessing the past performance of loan portfolios based on yearly vintages in accordance with the present invention.

FIG. 4A is a table which illustrates calculations performed to obtain data for the graphic of FIG. 4.

FIG. 5 illustrates a further graphical method of the present invention for showing both the past performance and the future predicted performance of loan portfolios.

FIG. 6 is an explanatory graph provided for explaining how a portion of the graph of FIG. 5 is obtained.

FIG. 7 illustrates the format of a roll rate delinquency table for one year which is used in the matrix link analysis module of the present invention.

FIG. 8 is a table which shows the methodology and equations used in forecasting bad rate probabilities in the matrix link component of the present invention.

DETAILED DESCRIPTION OF EMBODIMENTS OF THE INVENTION

Figure 1:
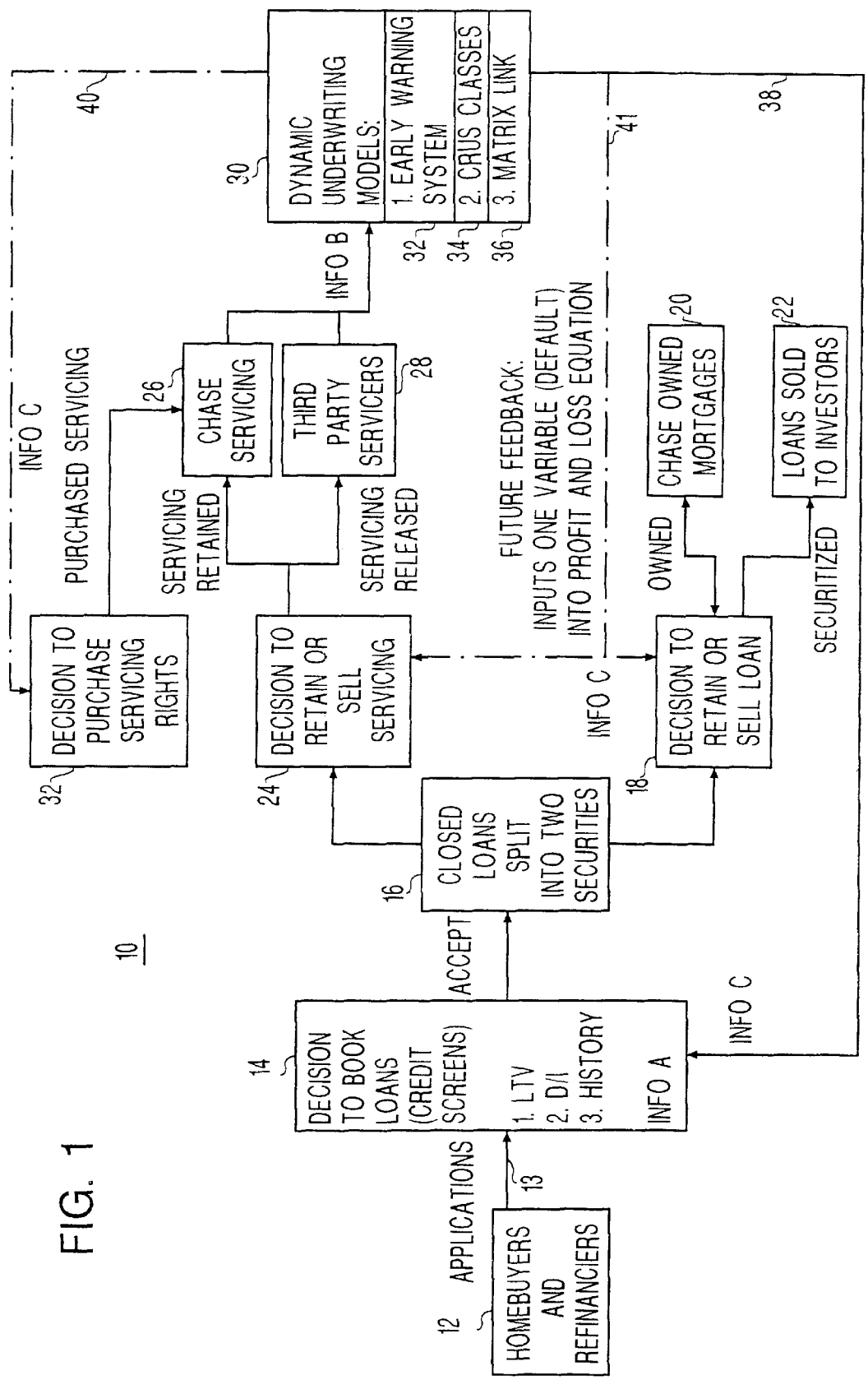
FIG. 1 is an overall block diagram of a dynamic underwriting system and method in accordance with the present invention.

By way of background and introduction, the general environment for the method and system of the present invention can be better appreciated by initial reference to FIG. 1. As illustrated therein, home buyers and refinanciers 12 typically submit applications for loans to one or more financial institutions 14. These institutions include loan granting departments that decide whether or not to book given loans by applying various credit screens, i.e. criteria. One screen may focus on the applicable LTV (loan to value) of a transaction, the D/I (debt to income) ratio of the involved transaction and/or on the credit history of the particular applicant.

Based on the aforementioned and other criteria, a decision is made to accept or reject a particular loan application. Each loan that has been accepted is added as another loan unit to a large portfolio of similar families of loans, e.g. conforming loans, jumbo loans, government loans, etc. A loan has typically a loan start date and a date by which the loan is expected to be fully paid up, as is typical of home mortgage loans. A loan that is issued for a fixed amount and period of time is known in the trade as a closed loan. These closed loans 16 are artificially split and treated as two business securities or entities—namely as a "loan" entity and as a "servicing" right, as indicated at 32.

Each loan unit or instrument represents to the financial institution an opportunity to earn a profit on the differential between its cost of money and the amount of interest earned from the borrower. Another profit component is realizable from the servicing element of each loan entity. That is, a finite budget for labor and equipment use must be allocated when the loan is issued to service each loan over its life time. The banking trade has traditionally derived substantial revenues from the servicing of loan portfolios, to the extent that they were able to service loans at a cost below the originally calculated service allocation. Consequently, banks and other financial institutions sometimes trade loan "servicing" contracts. These contracts are routinely purchased and sold in large units since they represent income opportunities. For example, a bank which lacks a servicing department might contract with another bank to service its loans at a set, per loan pricing arrangement. The bank that purchases the contract does so with the expectation of earning a profit on the project. If it develops later that a particular loan portfolio experiences a large rate of defaults, the extra servicing needed to collect funds on the loans might render the particular servicing contract unprofitable. In such a situation, the service organization might attempt to resell the service contract to another service organization which might be interested in it, for example, at an increased service rate.

With further reference to FIG. 1, block 18 represents the department of the financial institution which makes the decision whether to retain or sell a particular loan portfolio. Typically these loans are sold in very large blocks, each containing thousands of individual loan units. Those loan units originating at block 12 which are retained by the given financial institution are represented by block 20. On the other hand, as indicated by the block 22, a portion of the book of loans is sometimes sold off to investors and is securitized. Therefore, it will be appreciated that selling and purchasing loan portfolios requires careful examination of various loan product lines to assess their viability, profitability and related factors.

As already noted, another source of profit flows from the servicing portion of the loans. Block 24 identifies the step which decides whether to retain or sell the servicing component of a loan portfolio. Those loans for which servicing is retained are serviced at the bank which originated the loans as indicated at 26. The servicing of the balance of the loans procured at block 14 is contracted out to third parties for services as indicated at block 28. In addition, the servicing end 26 of the banking business is also able to purchase the servicing rights as indicated at 32.

As described, the banking industry distinguishes between ownership of loans and the servicing thereof. Loans that are owned by a given financial institution can be serviced by that institution's own servicing subsidiary or the servicing part can be contracted to third party servicing bureaus. Indeed, not all financial institution have loan servicing departments. Conversely, a bank with a servicing organization can purchase the "servicing" component associated with loans owned by other banks and render the servicing thereon.

In any case, it is self-evident that the profits from earning interest on loan portfolios and from the loan servicing line of business is heavily influenced by the performance of various loan groups vis-a-vis the default rate of these loans over the life of the loans, foreclosures, collection efforts, loan prepayment and the like. Loan portfolios which experience low default rates are easy to service and are highly profitable to financial institutions.

Traditionally, the decision to purchase, retain, sell or create loan portfolios demands critical analysis of the past performance of the loan portfolios under consideration. Moreover, such decisions invariably implicate assumptions and predictions as to how such loan portfolios will perform in the future. Not surprisingly, the decisions to book loans at block 14 typically depended on and required analysis and consideration by highly skilled and experienced persons having very keen and sharp analytical powers to determine the potential profitability of loan portfolios being considered.

The present invention departs from the prior art by providing a dynamic underwriting method and system 30 comprising several key components including an early warning system 32, a Crus Classes analysis section 34 and a matrix link 36, all to be described further on. Essentially, the information obtained from the subsystems 32, 34 and 36 is designed to be applied, via feedback line 38, to the decision box 14 in a manner which systemizes and provides a standardized approach to forming the decisions whether to book loans. The invention substantially increases the reliability, consistency and speed of the loan acceptance decision process. Further, the dynamic underwriting system 30 of the present invention can also be applied via feedback line 40 to the decisional box 32 which addresses the decisions at block 32 whether to purchase loan servicing rights of loans owned by other financial institutions. Finally, the feedback line 41 provides feedback for forming the decisions identified in blocks 18 and 24.

The invention shall now be described with respect to the subcomponents of the invention, including the aforementioned subsystems 32, 34 and 36, beginning first with the Crus Classes component 34.

Experience has shown that the past performance of a group of loans is often a key indicator of its future behavior. Therefore, the first step in the analysis process focuses on providing an improved analytical tool for the examination of the loans' past performance. This is the function provided by the Crus Classes system 34. The Crus Classes subsystem 34 essentially represents a fresh approach to the analysis of the prior performance of already booked groups of loans. The early warning system 32 is a forward looking system which comprises a method and process that is able to predict what portion of the overall number of loans in a particular loan group will experience 90+ day tardiness in payments by the borrower(s) thereof at anytime within a predefined time period, for example, the next two years. By way of example, if the system predicts that thirty loans out of a thousand in a given loan portfolio will experience 90+ day delay in payment at any time within the next two years, the EWS (Early Warning System) 32 will return the value 0.03 to indicate that it expects 3% of the loans in the given group to go "bad" at least once during the predefined time period. Finally, the matrix link component 36 provides a more sophisticated analytical model, in that it not only assigns a probability to how many loans will enter a 90-day default but, moreover, calculates the expected number of loans in default on a specific future date.

Turning first to the Crus Classes system 34, a common technique used in credit risk management in the mortgage industry is to group loans by common intervals of origination, e.g. annually, to compare their performances. For example, the mortgage industry might typically wish to analyze the performance of 1994 vintage loans. Vintage in this context means all loans that have been originated in 1994. The classification of loans into yearly vintages by the prior art has often resulted in significant distortions of analytical conclusions. Unlike wines for which classification into yearly vintages makes sense, lumping all loans originating in the same year into a same "vintage" distorts results because there are several exogenous factors which affect how these loans perform and these factors intrinsically vary over time in a manner which can produce significant quarterly, and even monthly loan performance fluctuations.

The present inventors have opted to use the term "Crus Classes" for its similarity to the wine industry. But Crus Classes, as used herein, differs from and departs from the prior art approach of grouping loans by annual origination dates. The invention overcomes some of the statistical inaccuracies associated with the prior art's attempts to lump loans into yearly vintages solely on the basis of the origination of a loan in a given year.

Traditional vintage techniques in the mortgage industry allow bankers to gauge the quality of mortgages as they are "aging". However, the inventors have added certain statistical procedures, such as hypothesis testing, used in the process control manufacturing environment, that allow the method of the invention to test for the statistical significance of the differences in performance among the "vintages". The result and benefits of the Crus Classes method to be described below is that it provides several advantages over the typical, prior art vintage analysis. For example, it incorporates a measure of dispersion. Further, it sets an analysis interval time shorter than a year to increase accuracy. This produces several advantages over traditional vintage analysis: (1) it automatically adjusts the comparison to account for different numbers of loans and for different size loans; (2) the Crus Classes method also allows management to set the confidence intervals; and (3) it automatically adjusts the year-to-year comparisons for loans with different credit volatility.

However, prior to describing the specific features of the Crus Classes method of the present invention it is worthwhile to introduce the following background information. Mortgage companies are vitally concerned with the performance of the loans they service and own. Active management of any loan portfolio requires the information needed to properly categorize the performance of the underlying loans. On an extremely broad and wide-sweeping comparison, delinquency rates are generated and compared to various classes of mortgage loans and summarized on a national level.

It is common in the industry for different financial institutions to share data about the total number of loans serviced by them and the appropriate number of loans that are in some form of delinquency. Delinquency categories or "buckets" range from the least serious, e.g. one payment past due, to the most serious category—namely, in foreclosure. The following is an example prepared by the MORTGAGE BANKERS ASSOCIATION of a delinquency chart:

Performance history or age of the loan,
remaining time to maturity,
loan amount,
interest rate,
borrower's credit worthiness,
geographic locations, and
underlying collateral type.

However, the effect of "age" on the performance of loans is a main factor that mortgage originators use to discern whether a group of loans was (or is) "good" or "bad".

Figure 1A:
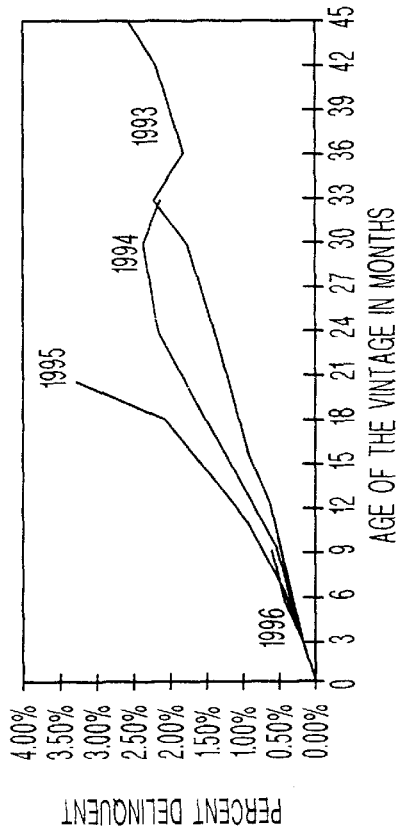
FIG. 1A is an explanatory chart which shows an example of the delinquency rates of various loans by vintage year for a given loan portfolio.

The vintage of the loan refers to the time when the given loan or family or group or set of loans has originated or has been placed on the books of the lending institution. In the mortgage industry, loans are categorized by year of origination, where all of the loans originated between Jan. 1, 1996 and Dec. 31, 1996 are referred to as '96 vintage loans. The yearly vintages and their corresponding delinquency rates are compared to each other to estimate relative performance and value. FIG. 1A is an example of one such vintage chart listing multiple vintages. This is a snapshot taken at the last quarter of 1996. Therefore, the oldest 1995 vintage is twenty one months old. In the figure, the 1995 curve shows a delinquency rate on the order of about 3% for the 1995, twenty one month old vintage. In contrast, the 1994 vintage curve shows a delinquency rate approximately one half the size of the 1995 vintage for the same twenty one month vintage. The mortgage default rates of FIG. 1A significantly affect future loan performance. Indeed, a single percentage rise in the delinquency rate represents many millions of dollars in losses to the typical financial institution which carries a very large portfolio of loans.

Further by way of background, mortgage loan portfolios are quite heterogeneous, with many subtle and changing variations in the basic product characteristics and behavior. An important consideration in the methodology of the present invention is the evolvement of a model that preserves the heterogeneous nature of the mortgages. Therefore, the inventors have grouped the mortgages by various (endogenous) characteristics and made inferences about the relationship between each of these characteristics and the resulting level of default. A large number of characteristics results in an extremely large number of combinations of groups to consider.

Figure 1B:
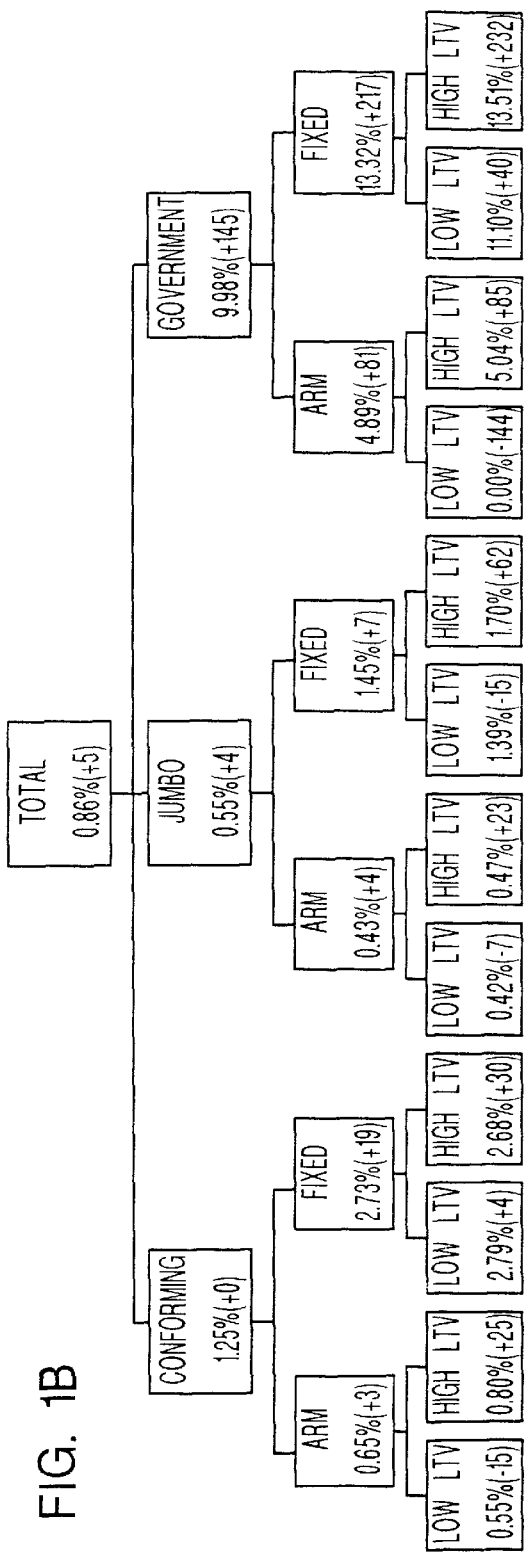
FIG. 1B is a tree chart and exemplar of an actual family of different types of loan groups and shows the rate of delinquency associated therewith.

FIG. 1B illustrates the significance of maintaining proper distinction lines between various loan instruments based on origination. Thus, FIG. 1B shows for a given financial institution a total loan portfolio value of, for example, several billions of dollars, with respect to which the overall

| Total Loans Serviced or Outstanding of 22,426,005 | 1 Payment Past Due or 30 Days of 733,330 | 2 Payments Past Due or 60 Days of 163,710 | 3 Payments Past Due or 90 Days of 141,284 | Loans in Foreclosure or F/C of 230,988 | Total Loans Delinquent or Total of 1,269,312 |
|---|---|---|---|---|---|
| % Delinquent | 3.27% | 0.73% | 0.63% | 1.03% | 5.66% |

Presenting delinquency performance in this manner is helpful in quantifying total delinquency, but it reveals nothing about the endogenous factors contributing to the default performance of the underlying loans. These endogenous factors which affect the performance of loan portfolios include, but are not limited to, some form of:

rate of delinquency is 0.86% (at tier 11 of the loan tree of FIG. 1B). However, for proper analysis the invention divides that loan portfolio into loan types including "conforming", "jumbo" and "government" (originated) loans, as indicated at tier 13. Note that the overall rate 0.86% of default is the weighed average of the delinquency rate which varies from 1.25% for conforming loans, 0.55% for jumbo loans, and 9.98% for government originated loans. Still further, each of the broad categories of conforming, jumbo and government loans are further divided (at tier 15) into ARM (adjusted rate mortgages) and fixed loans. Note the significant divergence in the rates of default. The same is true for the next subdivision (grouping) which hierarchically separates the third tier loan groups into low LTV loans and high LTV loans. For example, a government, ARM and low LTV loan at tier 17 has a rate of default of 0%, whereas a government, fixed and high LTV loan indicates (for the sample shown in FIG. 1B) a delinquency rate of 13.51%.

The invention applies the Crus Classes method on each node of the loan tree shown in FIG. 1B and then runs a hypothesis test to see if the performance of each year vintage is better, worse or statistically the same (at a confidence level of one standard deviation). It is estimated that there are 308 different combinations and that it takes approximately 100 megabytes of computer storage memory to analyze and graph the results for the model shown in FIG. 1B.

Analysis of past performance of loan portfolios requires making a decision as to what constitutes a delinquent or "bad" loan, as for example for the purposes of creating a chart such as in FIG. 1A. In an embodiment of the invention which has been reduced to practice a first selection was to choose the definition of a "bad" loan. It was chosen to represent a loan on which interest and principal payments were at least 90 days delinquent. That is, loans which are non-accruing or non-performing for a period greater than 90 days are deemed "bad".

Further, since the industry is accustomed to and prefers to refer to the "vintage" of a group of loans, for example 1993 vintage, 1994 vintage, etc., the Crus Classes method 34 also produces and presents its results in terms of loan vintages. But, it groups and selects vintages differently than the prior art.

Figure 2:
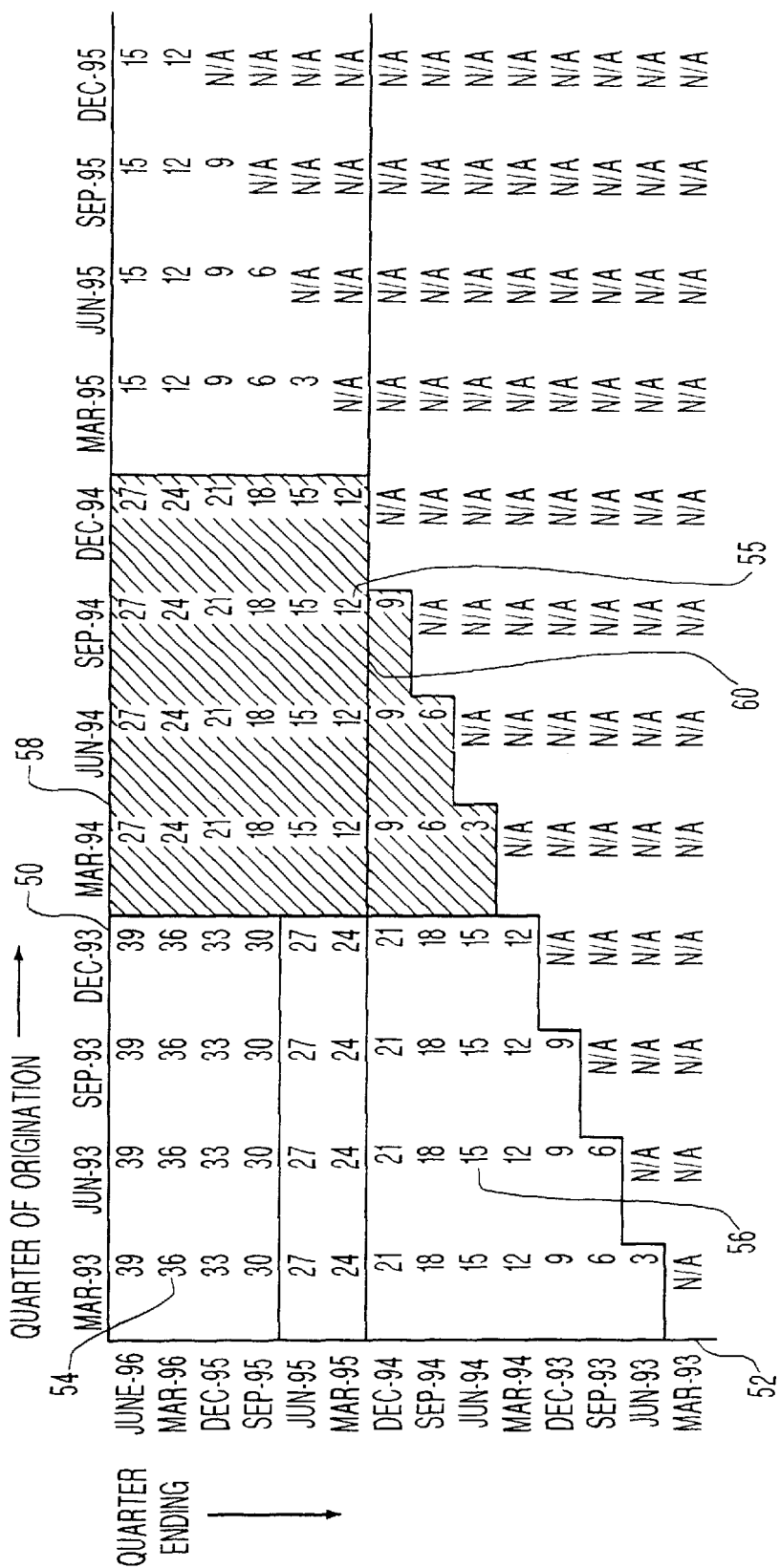
FIG. 2 illustrates a prior art method for assessing the profitability and performance of a portfolio on a yearly vintage basis.

The difference in "vintage" selection can be appreciated from the matrix tables of FIGS. 2 and 3. The abscissa axis 50 in FIG. 2 indicates the yearly quarter of origination, for example, March '93, June '93, etc. The ordinate axis 52 indicates the end quarter of a group of loans, for example, June '96, March '96, March '95, etc. The matrix data in FIG. 2 indicate the number of months that have elapsed from the quarter of origination to the end point. For example, a loan originating in March '93 is 36 months old in March '96 as indicated by reference numeral 54. Similarly, a loan originating in June '93 is 15 months old in June '94 as indicated by reference numeral 56.

The approach of the prior art has been to select and aggregate as 1993 and 1994 loan vintages all of the loans between the bracket lines 58 and 60 for the respective years 1993 and 1994. Carefully comparing the precise ages of the 1993 and 1994 vintage loans reveals two aspects which may undermine and distort the comparisons. First, the traditional approach reflected by FIG. 2 compares loans whose ages differ on average by twelve months. Indeed, some of the 1993 loans which are thirty six months old (see reference numeral 54) are two years older than the twelve month old 1994 loans (reference numeral 55). The above approach skews the results considerably since the performance of loans is very age sensitive as can be appreciated from FIG. 1A. It is far more meaningful to compare loans of the same age which originate in different years. Therefore, it is far more relevant to be able to compare the performance of different loan vintages, as of the time when they were at the same ages. For example, in seeking to answer the question: which loan vintage 1993 or 1994 is better, it is more relevant to know and compare the comparative performances of the above noted loan vintages when each was, for example, two years old. The Crus Classes method 34 of the present invention is able to do so.

With reference to FIG. 3, the present invention selects as the 1993 and 1994 loan vintages, those loans which are bracketed by the diagonally extending lines 62 and 64. In the selection method according to the present invention, the ages of the 1993 and 1994 loan vintages that are being compared are identical to one another. For example, for the year 1993 the ages of the loans vary between 6 months to 24 months and the same is true of the loans in the 1994 vintage year.

To further increase the accuracy of the comparison, each yearly vintage is divided into four quarterly portfolios, i.e. first, second, third and fourth quarters. All of the 1993 portfolios of the same quarterly age are summed and divided by the total number of all the loans with the same respective age. Referring again to FIG. 3, the present invention separately compares the 1993 and 1994 24 month old loans, then the 21 month old loans and so on. The actual mathematical calculations/analysis comparing loans originated in 1993 and 1994 and the manner of calculating bad rates is shown below in Tables I, II and III.

TABLE I

|   |   | Age (Months) | 3 | 6 | 9 |
|---|---|---|---|---|---|
| 1993 Vintage | # of Loans (n) | | $n_3$ | $n_6$ | $n_9$ |
| | BAD rate (r) | | $r_3$ | $r_6$ | $r_9$ |
| | STD | | $Sqrt(r_3*(1-r_3)/n_3)$ | $Sqrt(r_6*(1-r_6)/n_6)$ | $Sqrt(r_9*(1-r_9)/n_9)$ |
| 1994 Vintage | # of Loans (N) | | $N_3$ | $N_6$ | $N_9$ |
| | BAD rate (R) | | $R_3$ | $R_6$ | $R_9$ |
| | STD | | $Sqrt(R_3*(1-R_3)/N_3)$ | $Sqrt(R_6*(1-R_6)/N_6)$ | $Sqrt(R_9*(1-R_9)/N_9)$ |
| 1994–1993 | Difference (R − r) | | $R_3 - r_3$ | $R_6 - r_6$ | $R_9 - r_9$ |
| | STD of (R − r) | | $STD_3 - Sqrt(r_3*(1-r_3)/n_3 + R_3*(1-R_3)/N_3$ | $STD - Sqrt(r_6*(1-r_6)/n_6 + R_6*(1-R_6)/N_6)$ | $STD_9 - Sqrt(r_9*(1-r_9)/n_9 + R_9*(1-R_9)/N_9)$ |
| | Upper Bound | | $+1*STD_3$ | $+1*STD_6$ | $+1*STD_9$ |
| | Lower Bound | | $-1*STD_3$ | $-1*STD_6$ | $-1*STD_9$ |

TABLE II

| | Age (Months) | 12 | 15 | 18 |
|---|---|---|---|---|
| 1993 Vintage | # of Loans (n) | $n_{12}$ | $n_{15}$ | $n_{18}$ |
| | BAD rate (r) | $r_{12}$ | $r_{15}$ | $r_{18}$ |
| | STD | $Sqrt(r_{12}*(1-r_{12})/n_{12})$ | $Sqrt(r_{15}*(1-r_{15})/n_{15})$ | $Sqrt(r_{18}*(1-r_{18})/n_{18})$ |
| 1994 Vintage | # of Loans (N) | $N_{12}$ | $N_{15}$ | $N_{18}$ |
| | BAD rate (R) | $R_{12}$ | $R_{15}$ | $R_{18}$ |
| | STD | $Sqrt(R_{12}*(1-R_{12})/N_{12})$ | $Sqrt(R_{15}*(1-R_{15})/N_{15})$ | $Sqrt(R_{18}*(1-R_{18})/N_{18})$ |
| 1994– 1993 | Difference (R – r) | $R_{12} - r_{12}$ | $R_{15} - r_{15}$ | $R_{18} - r_{18}$ |
| | STD of (R – r) | $STD_{12} - Sqrt(r_{12}*(1-r_{12})/n_{12} + R_{12}*(1-R_{12})/N_{12}$ | $STD_{15} - Sqrt(r_{15}*(1-r_{15})/n_{15} + R_{15}*(1-R_{15})/N_{15})$ | $STD_{18} - Sqrt(r_{18}*(1-r_{18})/n_{18} + R_{18}*(1-R_{18})/N_{18})$ |
| | Upper Bound | $+1*STD_{12}$ | $+1*STD_{15}$ | $+1*STD_{18}$ |
| | Lower Bound | $-1*STD_{12}$ | $-1*STD_{15}$ | $-1*STD_{18}$ |

TABLE III

| | Age (Months) | 12 | 15 | 18 |
|---|---|---|---|---|
| 1993 Vintage | # of Loans (n) | $n_{21}$ | $n_{24}$ | $n_{27}$ |
| | BAD rate (r) | $r_{21}$ | $r_{24}$ | $r_{27}$ |
| | STD | $Sqrt(r_{21}*(1-r_{21})/n_{21})$ | $Sqrt(r_{24}*(1-r_{24})/n_{24})$ | $Sqrt(r_{27}*(1-r_{27})/n_{27})$ |
| 1994 Vintage | # of Loans (N) | $N_{21}$ | $N_{24}$ | $N_{27}$ |
| | BAD rate (R) | $R_{21}$ | $R_{24}$ | $R_{27}$ |
| | STD | $Sqrt(R_{21}*(1-R_{21})/N_{21})$ | $Sqrt(R_{24}*(1-R_{24})/N_{24})$ | $Sqrt(R_{27}*(1-R_{27})/N_{27})$ |
| 1994– 1993 | Difference (R – r) | $R_{21} - r_{21}$ | $R_{24} - r_{24}$ | $R_{27} - r_{27}$ |
| | STD of (R – r) | $STD_{21} - Sqrt(r_{21}*(1-r_{21})/n_{21} + R_{21}*(1-R_{21})/N_{21})$ | $STD_{24} - Sqrt(r_{24}*(1-r_{24})/n_{24} + R_{24}*(1-R_{24})/N_{24})$ | $STD_{27} - Sqrt(r_{27}*(1-r_{27})/n_{27} + R_{27}*(1-R_{27})/N_{27})$ |
| | Upper Bound | $+1*STD_{21}$ | $+1*STD_{24}$ | $+1*STD_{27}$ |
| | Lower Bound | $-1*STD_{21}$ | $-1*STD_{24}$ | $-1*STD_{27}$ |

Table I contains the calculations and comparisons for 1993 and 1994 loans which have vintage ages of 3, 6 and 9 months; Table II does the same for loans aged 12, 15 and 18 months; and Table III does so for loans that are 21, 24 and 27 months. The first line in Tables I–III sets forth the total number ($n_3$, $n_6$, etc.) of loans of the given vintage. The second line in the Tables sets forth the bad rates ($r_3$, $r_6$, etc.) for each vintage age. The third line calculates the standard deviation (STD) of the bad rate, using the indicated equations. The first three lines of Table I supply the relevant information and calculations for the 3, 6 and 9 month old 1993 vintage. The next three lines of Table I supply the same information for the 1994 vintage. The bottom four lines of Table I calculate the differences and compare the results for 1993 and 1994 vintage years. The last two lines calculate upper and lower bounds for the standard of deviation. The two bounds are plus one and minus one standard deviation, but management can set this based on their tolerance for default risk. These calculations constitute the Crus Classes method 30 of the invention whose effect can be appreciated from reviewing the analysis results plotted in FIG. 4.

Figure 4:
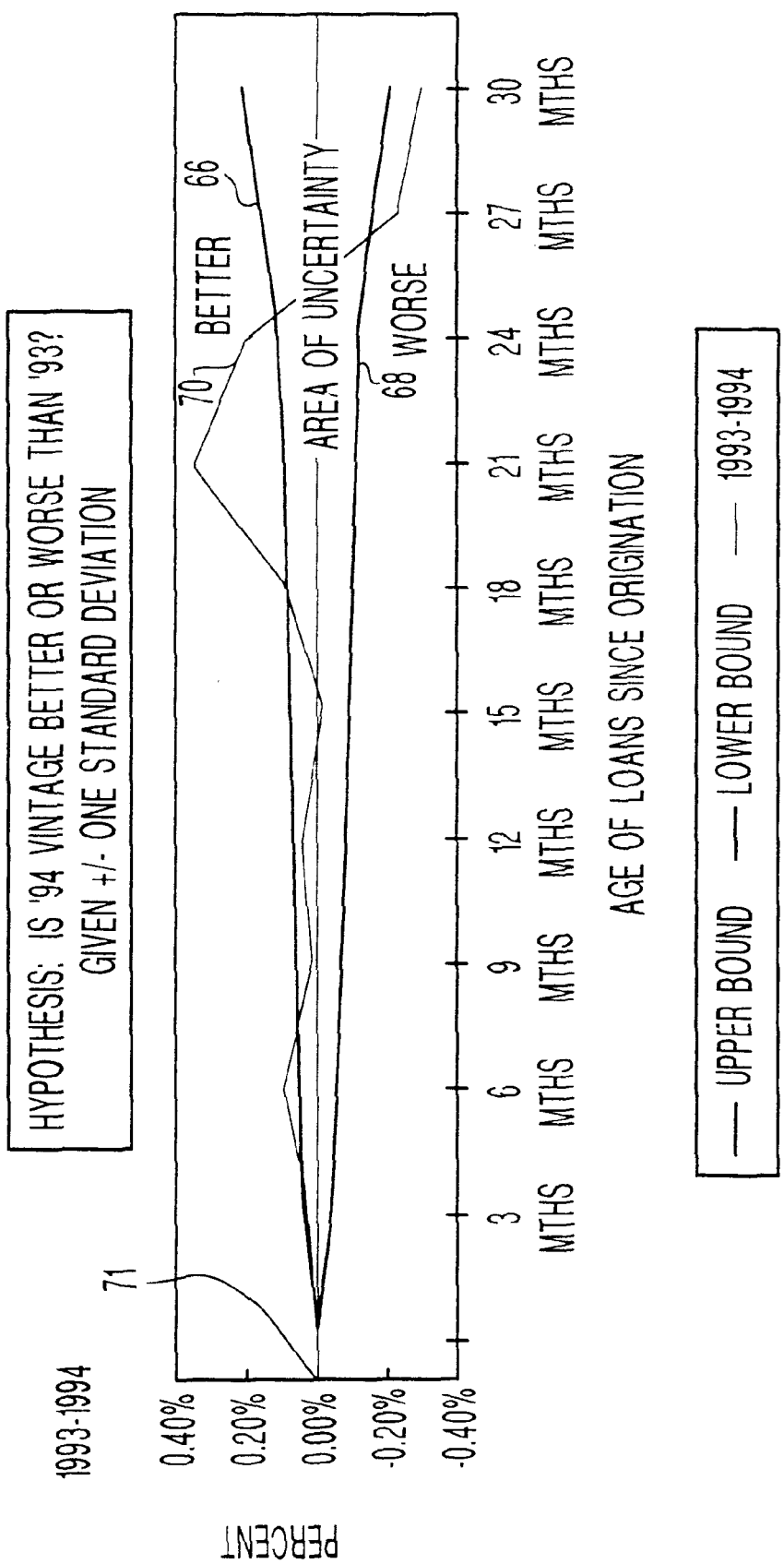
FIG. 4 is a graphic that illustrates a method of the present invention involving assessing the relative value of different vintage loan portfolios.

That is the values calculated in Tables I, II and III above for the differences between vintages 1994 and 1993 are plotted in the graph of FIG. 4 relative to a zero percentage base 71. The curve 70 represents the magnitude of the difference in the "bad" rates of loans of the same age. The value of the curve 70 equals $r_3-R_3$; $r_6-R_6$; etc. shown in Tables I–III. One would be tempted to assume that the 1994 vintage performs better than the 1993 anytime the value of the curve 70 goes over zero percent and vise versa. However, such a mode of analyzing the data would be subject to reaching wrong conclusions due to statistical variations. To overcome this drawback, it is more significant to ask whether a vintage that appears to perform better does so in fact or whether it merely reflects a temporary phenomenon. To answer the question, the invention uses a hypothesis testing technique which allows the analyst to set a confidence interval which is adjustable to allow for different corporate risk tolerance levels. Thus, the confidence interval can be equated to the amount of risk tolerance management will accept in originating, purchasing, retaining or servicing loan portfolios. These confidence intervals can also be used in product profitability and capital allocations. Management can then rank the vintages by product, program, age and size. To this end, the Tables presented above also calculate the standard deviation of the difference in performance and sets upper bounds and lower bound of +1 and −1 standard deviations for each quarterly vintage. These upper and lower limits which appear in the last two lines of Tables I, II, III are plotted in the form of curves 66 and 68 in FIG. 4. The area between the curves 66 and 68 is an area of uncertainty.

With this in mind, since the invention superimposes the curve 70 over the area of uncertainty, one can state with greater certainty which vintage performs better only in the areas outside the area of uncertainty. Thus, the graph of FIG. 4 shows that the 1994 loan vintages are "better" than corresponding 1993 loan vintages for loans that are 6, 21 and 24 months old. On the other hand, the 1993 vintage appears to be better for loans that are 27 and 30 months old. During other months, the result is too close to conclude with the chosen degree of certainty which vintage is better. The chart of FIG. 4 underscores the fallacy of the prior art in referring to yearly vintages as better or worse. One must be more specific as to time and other criteria, since relative performance changes dynamically with time.

While the invention has been described above in relation to the consideration of vintages in yearly quarterly units, note that in the loan industry exogenous factors such as changes in economy, unemployment and inflation are time varying factors that vary greatly over an annual interval and therefore the system of the invention permits analysis based on the choice of any interval unit. The important thing to realize is that in general, a new mortgage loan is more sensitive to small changes in delinquency performance than an older mortgage. This is shown by widening of the confidence interval bands over time. So in essence, the application of the above described Crus Classes method corrects for this fact.

The invention also takes and adjusts the vintage rating based on quality comparisons for different volatilities of default. In essence, using the system lets the user to set policies with respect to volatilities of default which is another form of risk management. This is new to the industry.

The confidence level in the assessment of the difference in quality between groups of loans depends to a certain degree on the sample size of the loans. For small groups of loans, one will always be less certain of their performance. The real question is how much less certain. This is answered with the Crus Classes method. The Crus Classes method also automatically adjusts the comparison for different sample sizes of loans in each node or product. This is evident in the calculations in the previously presented tables which always take into account the number of loans. An actual calculation that has been carried out to evolve the vintage comparison graph of FIG. 4 in accordance with Tables I, II and III is presented in FIG. 4A.

As described above, the Crus Classes method 34 delivers a comparison of two loan vintages either in the form of a graph or tabulated data which permits one to get a sense of which vintages are performing better. This information can then be used in making manual or automatic, computer generated yes/no decisions whether to originate, purchase, or to maintain and sell various vintages of loan products or servicing rights as needed at the decisional blocks 18, 24 and 32 of FIG. 1.

The basic premise of the Crus Classes analysis is that the future performance of these loan vintages will match the past pattern. This may not necessarily be true. To this end, the early warning system (EWS) 32 of the present invention further enhances the loan analysis process by incorporating an application of behavioral scoring that has been specifically designed to be used on closed end loans with longer maturities such as mortgages. The EWS 32 is able to statistically predict the probability that a group of loans will experience credit performance problems during a future preselected time period, without waiting for that loan to season. In the case of mortgages, the time to season is typically three to seven years. The EWS 34 is intended to provide management with automated analytical tools which allow making decisions well in advance of the aforementioned three to seven "seasoning" period.

By utilizing the EWS, a mortgage originator can perform portfolio analysis and ascertain which product type, program, type of underwriting, property type, type of customer, origination channel, etc. is at risk, without waiting for the mortgages to actually mature and enter default. The only constraint is the amount of data attributes that the mortgage loan originator keeps on any customer over time, which for the purposes of the present invention may be two years. The mortgage originator can then dynamically adjust the flow of origination by altering any credit criteria derived from a particular attribute.

The EWS 34 constitutes the dynamic component of the underwriting concept of the present invention. With this concept, the decision maker can estimate improvements in credit quality for each specific type or amount of change in a criteria, i.e. he or she can calculate the marginal contribution of any attribute on record.

More specifically, the forward looking feature of the EWS component of the invention attempts to forecast the likelihood the borrowers will enter a 90+ days past due delinquency on their mortgages. This condition—the occurrence of a 90-day past due delinquency—is defined as a "bad" condition relative to any loan. The EWS calculates the probabilities of bad conditions occurring by combining loan information with the credit bureau's current behavioral score for the given borrower. In other words, the EWS combines the borrower's current mortgage status (default status and age) with a forecast that is based on the borrower's performance on other obligations and uses this information to forecast the bad condition. The EWS system makes three major assumptions:

The future performance pattern of defaults will be the same as in the past;

The future performance depends upon the current loan characteristics and is dependent on past performance only through the credit bureau scores. Therefore, the EWS also carries all the assumption of the credit bureau's score that was used; and The EWS employs a logistic regression model to accurately and sufficiently predict default behavior.

The aforementioned "bad" condition is a discrete (yes or no) event that occurs when and if an individual loan is at least once three payments past due at any point during a forward looking preset time period, for example, two years. Bad loans are assigned the value "1" and good loans the value "0". How many times the loan enters "bad" is not considered in the EWS. A good loan is never three payments past due over the aforementioned two year time frame and therefore is assigned a loan of a value "0". Preferably, in order to provide reliable information using the EWS system, the underlying portfolio should have at least 100,000 loans and the loans should consist of different distributions of ages, types, locations, etc. In an embodiment of the invention which has been reduced to practice the number of loans in the portfolio exceeded one million.

The EWS probability of loans entering the bad condition is developed or calculated on the basis of looking backward in time through a development period which may similarly constitute a two-year time period. The EWS formula considers the age of the loan at the beginning of development period; the credit bureau score for the loan at the beginning of the development period; the delinquency status at the beginning of the development period; and the type of product, for example, whether a government or conventional or adjustable rate mortgage, etc.

The following logistic model has been applied to the underlying portfolio (government and conventional loans being considered separately). In the formula shown below, P is the probability of a loan becoming bad at any time in the coming two years:

$$\mathrm{Log}(P/(1-P)) = A + (B_1 * \mathrm{AGE}) + B_2 * C0 + B3 * D_1 + B4 * D_2 + B_5 * \mathrm{SCORE} + B_6 * \mathrm{NO\ SCORE}).$$

In the equation, AGE is defined in categories of quarters from 1–40. Therefore $B_1$ and AGE are 40 dimension row and column vectors respectively. SCORE is the mortgage score from a credit bureau rating company such as the well known Equifax rating bureau, at the beginning of the two-year time period, i.e. August 1994. Note, if no such score is available, the invention assigns the lowest possible value, namely 200. The Equifax scoring scores vary from 200 to 1000. The dummy variables in the above equation are defined as follows:

$$C0 = \begin{cases} 1 & \text{if the loan is current at the beginning of the time period;} \\ 0 & \text{otherwise.} \end{cases}$$

$$D1 = \begin{cases} 1 & \text{if the loan is 1 month past due at the beginning of the time period;} \\ 0 & \text{otherwise.} \end{cases}$$

$$D2 = \begin{cases} 1 & \text{if the loan is 2 months past due at the beginning of the time period;} \\ 0 & \text{otherwise.} \end{cases}$$

$$\text{NO SCORE} = \begin{cases} 1 & \text{if the loan has no credit score available at the beginning of the time period;} \\ 0 & \text{otherwise.} \end{cases}$$

The coefficients A, $B_1$, $B_2$, $B_3$, $B_4$, $B_5$ and $B_6$ are estimated by running the model over the underlying portfolio.

All of the forecasting is done at the individual loan level and then the results are aggregated into the portfolio of interest by defining or grouping certain loan characteristics (location, rate type, maturity, LTV, etc.) to make comparisons. Even though the invention presents the mean probability for a predicted group, the information contained in the individual loan level data is preserved because the invention explicitly considers the dispersion around the mean of the bad rate over time.

To forecast the probability of an individual loan entering 90+ day default during the predetermined time period (i.e. the two year time frame), all one need do is insert the estimated coefficients and the characteristics of that individual loan into the logistic equation for "P" presented earlier.

The logistic model in the form of the aforementioned equation provides numerical results which are suitable of being graphically presented as shown in FIG. 5. The graph enables management to readily interpret and form decisions based on the predictions which it contains. In accordance with a further embodiment of the invention, the results are feedback by the computer which then provides yes/no decisions based on predetermined default risk or profit criteria set by the operator.

FIG. 5 is a snapshot taken in 1996 and depicts loan experience looking both backwards to the past two years and forwards over a similar two year time span. The vertical solid bars 72 represent the current mean (expost) bad rates for a particular group over the past two years. In other words, these bars show the mean bad rate percentages of a group of loans that originated in a particular year. For example, the bar 72 for the loans originated in 1989 shows a bad rate of about 12.5%. The score for the 1991 loans is just about 8% whereas the bad rate for 1996 is quite low (under 5%), reflecting the fact that this vintage of loan has not yet matured sufficiently.

The hatched vertical bars 74 represent the forecasted mean bad rates (exante) for the same group of loans over the next two years. The value for the 1996 vintage is somewhere around 7% indicating an expected delinquency rate of 7% even though the past two-year performance had an actual bad rate of only about 2.5%. The curve 76 represents the expected bad rate curve that is obtained by modifying the forecasted bad rates by the risk ratio on nearby vintages, and this shall be explained more fully later on.

One should not place much emphasis on whether the curve 76 is above the solid bars 72, since this may merely reflect the normal pattern of seasoning for mortgages. Nor should one place much emphasis on the absolute height of each bar, since this may reflect different expectations among the various groups or types of loans that are being analyzed. Instead, the graph of FIG. 5 indicates three important benchmarks for reviewing and forecasting the risk in the given loan portfolio. First, note the jump which is indicated by the arrow 84. It represents a jump which occurs when the difference between the hatched bars 74 and the solid bars 72 is greater than one standard deviation above the historical age weighed performance for that vintage. The bigger the jump, the more serious the quality problem. This measure is particularly useful on younger vintages, e.g. the 1996 vintage to which the arrow 84 is pointed.

Second, the size of the portion of the hatched bars 74 which protrudes above the expected bad curve 76 indicates an unusual level of risk in the past or the future for that group of loans. Note the arrows 80 and 82 which indicates such conditions. Finally, the arrow 78 indicates a turning point which represents the point at which the first derivative of the expected BAD rate curve changes sign from positive to negative: i.e. the first time the bad rate drops as the loans age increases. The younger the age at which the turning point occurs, the earlier the portfolio's credit performance will or has matured.

The manner in which the curve 76 of FIG. 5 is derived may be better understood by reviewing FIGS. 6 and 7. More specifically, the curve 86 is developed by taking a snapshot at a point in time looking at loans of different quarterly ages and asking how many in each age group entered the "bad" state during the preceding predetermined time period, e.g. two years.

Initially, the EWS 34 develops for each empirical two-year period of performance the bad rate curve as a function of age in quarters. See the quarterly bad rate curve 86 in FIG. 6.

Next, using a moving average, the invention smooths each curve to reduce the randomness of the quarterly performance, thus obtaining the smooth curve 88 in FIG. 6. In fact, the slopes of the yearly bad rate curve are calculated as the percentage change in bad rates from one year to another year, which is known as the risk ratio. To improve the integrity of the results and protect against possible statistical aberrations, at least eight two-year time periods are considered, with the means and standard deviations of the risk ratios calculated.

To find the point on line 76 for 1991, the invention uses the point on line 76 for 1990 which has the expected bad rate for 1990. Multiplying this bad rate by the corresponding mean risk ratio from FIG. 6 obtains the expected bad rate for 1991 and its standard deviation. This expected bad rate is used for the point on line 76 for 1991. However, if the forecast bad rate (bar 74) is within the expected bad rate, plus or minus one standard deviation, the invention just substitutes the expected bad rate by the forecast bad rate so that the line 76 passes through the top of bar 74.

The third in the triad of dynamic underwriting tools of the present inventions, the matrix link system 36, uses the information developed by the Crus Classes technique 34 and early warning system 32 to develop a probability based prediction of how many of a given set of loans will be "bad" at a selected future date.

More specifically, while the Crus Classes method 34 analyzes the past performance of loan vintages and the EWS system places a probability on a group of loans entering the bad state within a preset time frame, i.e. a window, the matrix link system 36 is designed to predict the default status performance of a group of loans at a preset point in time within the window of operation of the EWS. For example, the EWS method is able to say with respect to a group of loans that 3% of those loans will enter a bad state (90+ days in arrears) at one time or another during a two year window. In comparison, the matrix link is designed to answer the question how many loans will be non-accruing, i.e. in the 90+ payment overdue state, at the end of the first quarter of the two year window or nine months into the window and so forth, taking into consideration that some loans may enter the bad state or exit therefrom due to prepayment or on account of having been matured, or by completing foreclosure.

To perform its functions, the matrix link system 36 predicts how many borrowers that enter a 90-days delinquency state remain there, how many loans will return to "good" status and, finally, in which quarter over the predefined window, e.g. two years, will these transitions occur. Note that a particular loan can enter a bad state, return to a good state or remain in a bad state. Loans may mature, pay off or complete foreclosure during the predefined window period and thus exit the loan portfolio being analyzed. In order to provide a quantitative measure of the transitions of loans between different states, the present inventors have developed a so-called delinquency transition matrix in a form which, in one embodiment thereof, appears as in the table in FIG. 7.

In the table of FIG. 7, use is made of a historical file spanning four years and including vintage years 1993–1996. The table shows the delinquency performance of a particular group of loans. Further, the table stratifies the loans by age of origination. Note that the table lists separately the results for three different types of loans, namely conforming loans, jumbo loans and government loans. In each case, it shows the probability of a loan transitioning (a) from a bad state to a bad state, (b) from a bad state to a good state; (c) exiting, i.e. maturing and therefore being dropped from the sample of loans being considered, (d) from good to bad, (e) from good to good; and (f) from good to exit state.

Using the percentages listed in the delinquency transition matrix in the Table of FIG. 7, one can then begin to convert the information obtained through the EWS system 32 into the forecasts of how the Crus Classes vintages will perform at predefined time periods within the window. The table in FIG. 8 illustrates the formulae evolved by the present inventors which are as follows.

First, the current age of the loan at the time of forecast is determined. In the table of FIG. 7, the age of the loans is indicated in years (1, 2, 3, 4 . . . 10). However, in an actual implementation of the invention, the vintages have been stated and the formula is calculated in terms of quarters to obtain increased accuracy.

For each group of loans of a particular age, the invention uses a 3-month transition matrix to forecast three months forward, a 6-month transition matrix to forecast six months forward, a 9-month transition matrix to forecast nine months forward and a 12-month transition matrix to forecast twelve months forward.

Based on the choice of data in the previous step, the invention calculates respectively looking forward three, six, nine and twelve months:

1. how many good loans and bad loans will exist from the portfolio;
2. how many good loans will turn into bad; and
3. how many bad loans will remain bad.

From the above data, one obtains the classic "roll-rate" forecast which provides the first component of the forecast. The above approach merely projects forward the results that have already occurred in the past, on the expectation that they will repeat themselves. However, a greater benefit of the matrix link technique of the present invention comes from adding the additional information that is contained in and/or obtained by the early warning system 32.

To this end, the invention:

(a) Calculates an empirical ratio obtained as—the cumulative number of loans which are 90+ at each quarter (EOP) and divides it by the number of loans that are 90+ at least once during these four quarters.

(b) From the EWS, the invention obtains or forecasts the "bad" rate for the two-year window based on the EWS method 32.

Figure 9:
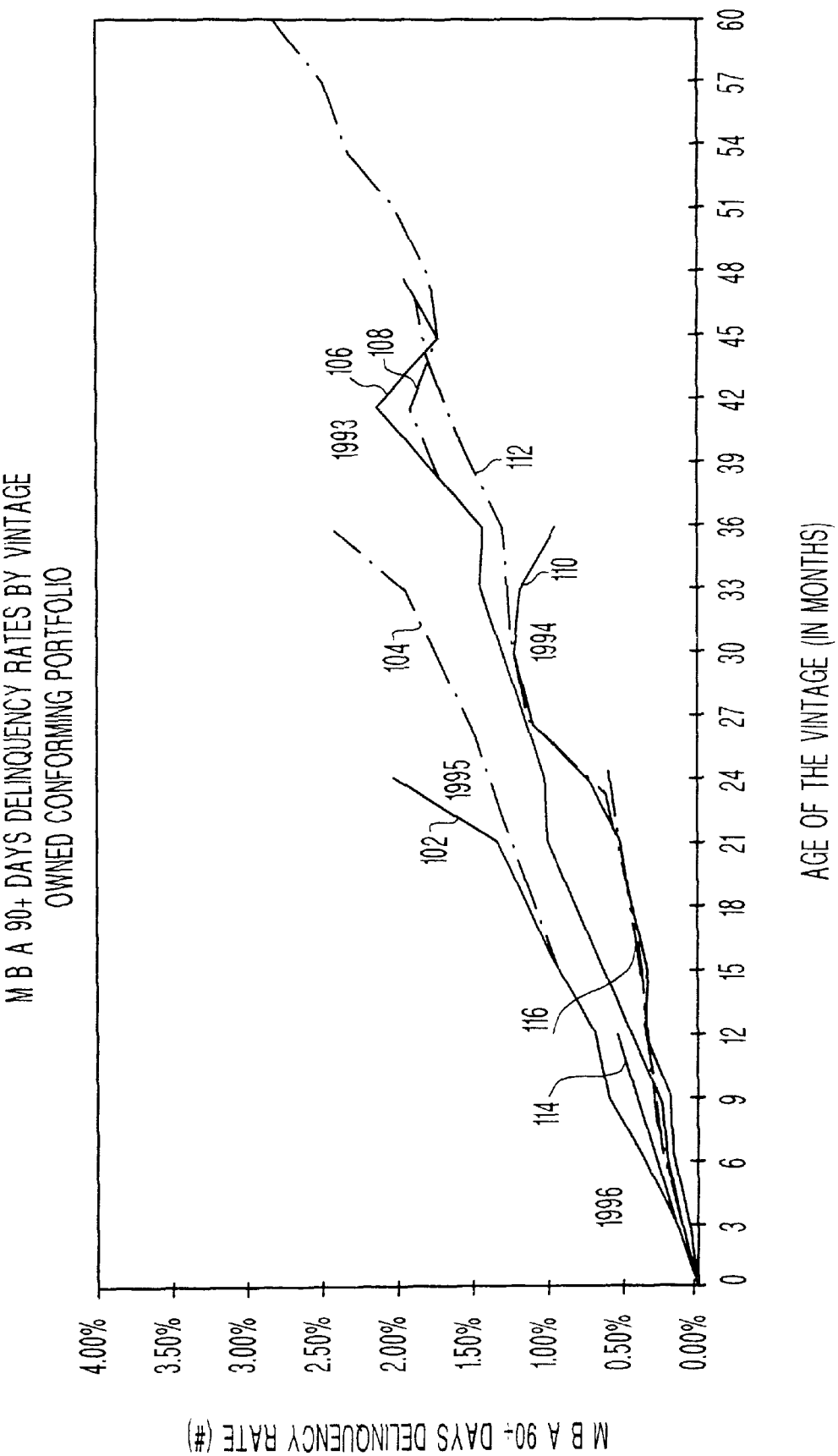
FIG. 9 is a plot of the final results obtained with the matrix link component of the present invention.

(c) Using the EWS, the invention forecasts the bad rate and the empirical ratio above as a new piece of information to adjust the classic "roll-rate" forecast. This is in essence what comprises the "matrix link" method 36. FIG. 9 provides the results of the matrix link in graphical form. In the example shown, the performance of different vintage loans is predicted one year forward in quarterly installments starting in 1997.

For example, the plot 102 shows the two-year performance of 1995 vintage loans which range in age (months) from 0 to 24 months, as viewed looking backwards in time in 1997. The curve 104 shows the delinquency rate percentages predicted for the next twelve months. For example, when the groups of loans attain an age of 27, the delinquency rate can be read on the ordinate axis. The same is true for this group of loans when they reach an age of 30 months, 33 months and 36 months. The reason that the curve 104 has a predicted value below the actual value is that the prediction in the matrix link uses a moving sum average which weighs down the actual sharp up-turn in the "bad" rate which has actually occurred toward the end of the curve 102.

The above remarks are also applicable to the curves 106, 108 which apply to the 1993 vintage, the curves 110 and 112 which are applicable to 1994 vintage, and to the curves 114 and 116 which apply to the 1996 vintage.

Note that the Crus Classes are less static than traditional mortgage vintage analysis. Therefore, the performance of the last three points of any vintage can still change somewhat, for better or worse.

The matrix link lines, i.e. the curve 104, 108, 112, and 116 also show where the inventors expect the last three Crus Classes points to adjust over the next nine months.

Figure 10:
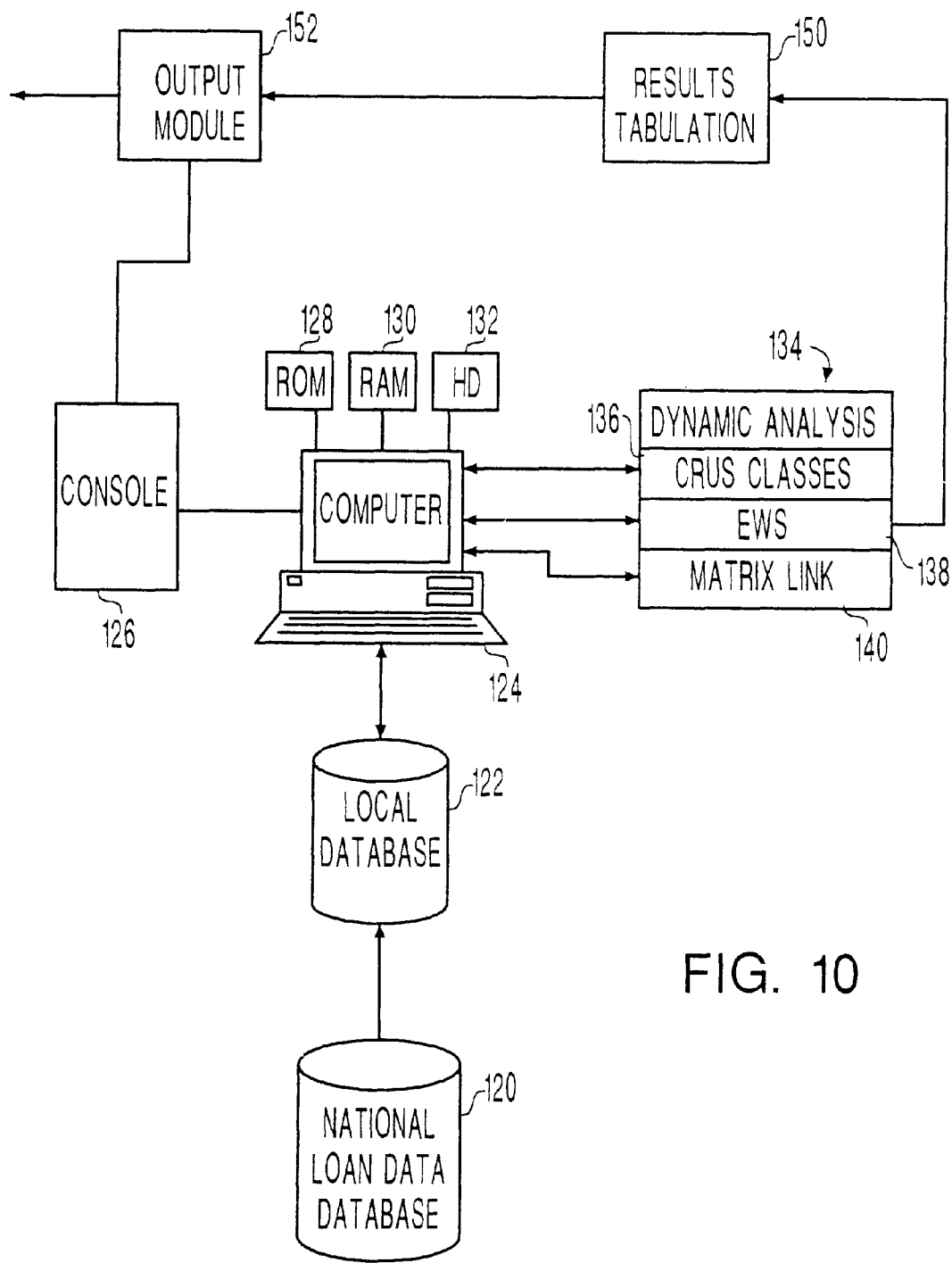
FIG. 10 is a hardware/software block diagram of key components of the present invention.

The system of the present invention lends itself easily to being implemented through use of a general purpose programmable computer as illustrated in FIG. 10. Thus, the general purpose computer 124 communicates with a local database 122 which receives a wealth of statistical and specific information about various loans from diverse sources. For example, the source of the information may be a national loan database 120 which is maintained by certain industry groups. The general purpose computer 124 has the usual complement of peripherals including an operator's console 126, ROM 128, RAM 130 and a hard disk 132.

The computer 124 operates under control of major software blocks which perform the dynamic analysis 134 in a manner already described. The main software components are the software routines 136 which handle the development and analysis of the Crus Classes associated with the creation of the loan vintages. The early warning system block 138 calculates probabilities of loans going bad within a predetermined forward looking window. Finally, the matrix link software block 140 forecasts the probabilities that a fraction of loans will go bad within the window at a particular time.

The analytical results developed by these software subroutines or blocks 136, 138 and 140 are tabulated in the tabulation software block 150 and outputted through an output software block 152. The output can be in the form of a signal which drives a printer which generates a graphical representation of the results in the manner previously described. Alternatively, the output may supply the results to the console 126 for visual inspection by the operator. Alternatively, the operator may program the computer 124 via the console 126 to provide yes/no answers as to whether an investment should be made or continued to be made in a particular loan portfolio, again as already described.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for analyzing a loan portfolio using a computer program, wherein the loan portfolio comprises a plurality of loan units, the process including the steps of:
   separating the loan portfolio into a plurality of loan groups in a manner such that a date of origination of each of the loan units included in a loan group are all within a first time interval;
   assigning a date of origination to each of the loan groups;
   selecting an analysis time interval;
   selecting a plurality of analysis points in time within the analysis time interval;
   counting a bad rate of the loan units in each loan group at each analysis point in time, the bad rates being determined by counting the loan units in each loan group on which payments are in arrears, at the particular analysis point in time, for a time period greater than a second time interval;
   determining an age of each of the loan groups at each of the analysis points in time, the age being measured from the date or origination of the loan group to the analysis point in time;
   averaging the counted bad rates for each of the loan groups that are the same age; and
   providing a comparison of the averaged bad rates for a plurality of different ages on a visually perceivable output medium, to allow comparing the bad rates of the different loan groups.

2. The process of claim 1, in which the analysis time interval is about two years and the analysis time interval commences about two years prior to the date of a last analysis point in time.

3. The process of claim 2, in which the first time interval is about three months.

4. The process of claim 2, in which the first time interval is about one year.

5. The process of claim 4, in which the one year first time interval coincides with a calendar year.

6. The process of claim 1, in which the second time period is about ninety days.

7. The process of claim 1, in which each loan group comprises at least 50,000 loan units.

8. The process of claim 1, further including:
   allowing an operator to set the durations of one or more of the first, second and analysis time intervals;
   deploying a general purpose computer for enabling the computer to automatically provide "yes" or "no" comparisons as to whether a given financial institution should choose to invest in a particularly identified loan group.

9. The process of claim 1, including:
   developing a projection of bad rates for a plurality of said loan groups by calculating probabilistic bad rates for said plurality of loan groups during a forward looking window extending over a third time interval, the projected bad rates comprising an early warning system whose results are depictable on the output medium.

10. The process of claim 9, in which the step of calculating the probabilistic bad rates for said loan groups is carried out by using a logistic regression formula.

11. The process of claim 10, in which the logistic regression formula is $$\mathrm{Log}(P/(1-P))=A+(B_1{}^*\mathrm{AGE})+B_2{}^*C0+B3{}^*D_1+B4{}^*D_2+B_5{}^*\mathrm{SCORE}+B_6{}^*\mathrm{NO\ SCORE})$$

wherein, P is the predicted bad rate, AGE is defined as the age of the loan group and $B_1$ and AGE are row and column vectors of a dimension matrix of a predetermined size, SCORE is a mortgage score from a credit bureau and C0, $D_1$, $D_2$ and NO SCORE are dummy variables, and the coefficients A, $B_1$, $B_2$, $B_3$, $B_4$, $B_5$ and $B_6$ are estimated by running a model of the equation over a preselected loan portfolio.

12. The process of claim 11, wherein the value C0 is assigned a value of one if the loan is current at the beginning of the analysis time interval and zero otherwise, the variable $D_1$ equals one if the loan is one month past due at the beginning of analysis time interval and is zero otherwise, $D_2$ is assigned a value of one if the loan is two months past due at the beginning of the analysis time interval and zero otherwise, and NO SCORE equals one if the loan has no credit score available at the beginning of the analysis time interval and zero otherwise.

13. The process of claim 10, wherein the third time interval is of the same duration as the analysis time interval.

14. The process of claim 1, wherein the loan units are closed loan units.

15. The process of claim 14, wherein the loans are mortgage loans.

16. The process of claim 1, including separating all loan units into different groups based on type and thereafter carrying out said separation of said loan portfolios into separate loan groups based on each type of loan.

17. The process of claim 16, wherein the types include conventional loans, jumbo loans and government originated loans.

18. The process of claim 9, including separating all loan units into different sets based on type and thereafter carrying out said separation of said loan portfolio into separate loan group based on each type of loan.

19. The process of claim 18, wherein the types include conventional loans, jumbo loans and government originated loans.

20. The process of claim 1, in which the output medium is a graphical chart.

21. The process of claim 9, wherein the output medium is a graphical chart.

22. The process of claim 20, which includes creating the graphical chart by plotting a difference between the bad rates calculated for a preselected pair of loan groups and including on the graphical chart an area of uncertainty.

23. The process of claim 22, wherein the area of uncertainty is selected as a +1 and −1 standard deviation of the difference in the bad rates for the preselected pair of loan groups.

24. The process of claim 21, including plotting on the graphical chart the probabilistic bad rates in the form of a first curve.

25. The process of claim 9, including developing a matrix link by calculating a bad rate of a preselected loan group as of a definite time within the fourth time interval.

26. The process of claim 25, including developing delinquency transition figures for selected ones of said loan groups.

27. The process of claim 26, including developing the delinquency transition figures by counting the numbers of loans which have transitioned from (a) good to bad state; (b) bad to good state; and (c) a status as a loan.

28. The process of claim 27, further including counting the number of loans which have remained in a bad state and counting loans which have remained in a good state.

29. The process of claim 25, including calculating for at least one of the loan groups matrix link results comprising a ratio of a predicted number of bad loans divided by a predicted number of new loans.

30. The process of claim 29, including plotting the ratio on the output medium.

31. The process of claim 9, including automatically providing yes/no decisions whether to invest in selected loan groups using the early warning system.

32. The process of claim 25, including automatically providing yes/no decisions using the matrix link system.

* * * * *